US009092568B2

(12) United States Patent
Rhee et al.

(10) Patent No.: US 9,092,568 B2
(45) Date of Patent: Jul. 28, 2015

(54) METHOD AND SYSTEM FOR CORRELATED TRACING WITH AUTOMATED MULTI-LAYER FUNCTION INSTRUMENTATION LOCALIZATION

(71) Applicant: NEC Laboratories America, Inc., Princeton, NJ (US)

(72) Inventors: Junghwan Rhee, Princeton, NJ (US); Hui Zhang, Princeton Junction, NJ (US); Nipun Arora, Plainsboro, NJ (US); Guofei Jiang, Princeton, NJ (US); Kenji Yoshihira, Princeton Junction, NJ (US); Myoungku Song, Blacksburg, VA (US)

(73) Assignee: NEC Laboratories America, Inc., Princeton, NJ (US)

( * ) Notice: Subject to any disclaimer, the term of this patent is extended or adjusted under 35 U.S.C. 154(b) by 72 days.

(21) Appl. No.: 13/873,610

(22) Filed: Apr. 30, 2013

(65) Prior Publication Data
US 2013/0290936 A1 Oct. 31, 2013

Related U.S. Application Data

(60) Provisional application No. 61/640,112, filed on Apr. 30, 2012.

(51) Int. Cl.
*G06F 9/44* (2006.01)
*G06F 11/36* (2006.01)

(52) U.S. Cl.
CPC ........ *G06F 11/3636* (2013.01); *G06F 11/3604* (2013.01)

(58) Field of Classification Search
None
See application file for complete search history.

(56) References Cited

U.S. PATENT DOCUMENTS

| 5,539,907 | A | * | 7/1996 | Srivastava et al. | 717/130 |
| 5,732,273 | A | * | 3/1998 | Srivastava et al. | 717/128 |
| 5,870,606 | A | * | 2/1999 | Lindsey | 717/128 |
| 5,987,250 | A | * | 11/1999 | Subrahmanyam | 717/130 |
| 6,011,920 | A | * | 1/2000 | Edwards et al. | 717/130 |
| 6,016,474 | A | * | 1/2000 | Kim et al. | 717/125 |
| 6,049,666 | A | * | 4/2000 | Bennett et al. | 717/130 |
| 6,052,708 | A | * | 4/2000 | Flynn et al. | 718/108 |
| 6,202,199 | B1 | * | 3/2001 | Wygodny et al. | 717/125 |
| 6,282,701 | B1 | * | 8/2001 | Wygodny et al. | 717/125 |

(Continued)

OTHER PUBLICATIONS

Ana Milanova et al., "Precise Call Graphs for C Programs with Function Pointers", Rensselaer Polytechnic Institute, 2003, <http://www.cs.rpi.edu/~milanova/docs/paper_kluw.pdf>, pp. 1-22.*

(Continued)

*Primary Examiner* — Thuy Dao
*Assistant Examiner* — Samuel Hayim
(74) *Attorney, Agent, or Firm* — Joseph Kolodka

(57) ABSTRACT

A system for automatically instrumenting and tracing an application program and related software components achieves a correlated tracing of the program execution. It includes tracing of endpoints that are the set of functions in the program execution path that the developers are interested. The tracing endpoints and related events become the total set of functions to be traced in the program (called instrument points). This invention automatically analyzes the program and generates such instrumentation points to enable correlated tracing. The generated set of instrumentation points addresses common questions that developers ask when they use monitoring tools.

17 Claims, 5 Drawing Sheets

(56) References Cited

U.S. PATENT DOCUMENTS

| | | | |
|---|---|---|---|
| 6,308,324 B1* | 10/2001 | Roediger et al. | 717/158 |
| 6,665,865 B1* | 12/2003 | Ruf | 717/157 |
| 7,194,732 B2* | 3/2007 | Fisher et al. | 717/131 |
| 7,251,810 B1* | 7/2007 | Nolte | 717/130 |
| 2002/0019716 A1* | 2/2002 | Agesen et al. | 702/83 |
| 2002/0053043 A1* | 5/2002 | Friedman et al. | 714/25 |
| 2002/0066088 A1* | 5/2002 | Canut et al. | 717/151 |
| 2002/0073063 A1* | 6/2002 | Faraj | 707/1 |
| 2002/0199172 A1* | 12/2002 | Bunnell | 717/128 |
| 2003/0056200 A1* | 3/2003 | Li et al. | 717/128 |
| 2003/0088854 A1* | 5/2003 | Wygodny et al. | 717/130 |
| 2003/0149960 A1* | 8/2003 | Inamdar | 717/118 |
| 2004/0111708 A1* | 6/2004 | Calder et al. | 717/131 |
| 2005/0055565 A1* | 3/2005 | Fournet et al. | 713/200 |
| 2006/0075306 A1* | 4/2006 | Chandrasekaran | 714/38 |
| 2008/0307266 A1* | 12/2008 | Chandrasekaran | 714/38 |
| 2009/0138886 A1* | 5/2009 | Anand et al. | 718/104 |
| 2010/0146220 A1* | 6/2010 | Panchenko et al. | 711/154 |
| 2011/0138368 A1* | 6/2011 | Krauss | 717/133 |
| 2011/0145800 A1* | 6/2011 | Rao et al. | 717/133 |
| 2012/0089966 A1* | 4/2012 | Martin et al. | 717/133 |
| 2014/0019985 A1* | 1/2014 | Krajec | 718/102 |
| 2014/0229921 A1* | 8/2014 | Arora et al. | 717/125 |

OTHER PUBLICATIONS

Gail Murphy et al., "An Empirical Study of Static Call Graph Extractors", IEEE, 1996, <http://ieeexplore.ieee.org/stamp/stamp.jsp?tp=&arnumber=493405>, pp. 1-10.*

Chris Pal, "A Technique for Illustrating Dynamic Component Level Interactions Within a Software Architecture", IBM Press, 1998, <http://delivery.acm.org/10.1145/790000/783178/p18-pal.pdf>, pp. 1-13.*

* cited by examiner

METHOD AND SYSTEM FOR CORRELATED TRACING WITH AUTOMATED MULTI-LAYER FUNCTION INSTRUMENTATION LOCALIZATION

RELATED APPLICATION INFORMATION

This application claims priority to provisional application No. 61/640,112 filed Apr. 30, 2012, the contents thereof are incorporated herein by reference

BACKGROUND OF THE INVENTION

The present invention relates generally to software system performance diagnosis, and more particularly, to correlated tracing with automated multi-layer function instrumentation localization.

In modern large system software, understanding the root cause of system problems is a complicated task. In the execution of application software, multiple software layers such as external libraries and low level system services are involved in addition to the main program binary. The code components of such layers create numerous hidden dependencies which cause the analysis of software problems (e.g., program bugs, performance anomaly) challenging. FIG. 1 depicts software problems and the root cause impact from related components in the same and/or other software layers.

In order to address this challenge, a correlated tracing of multiple software layers (e.g., the application, libraries, and the OS kernel) is necessary for constructing the complete view of program execution paths. By clarifying related events across multiple layers, this information can be a valuable input for application performance debugging to localize root cause problems.

Monitoring application execution has been studied in many publications and patents. Most such approaches meet one of two goals between performance and coverage. Also, these prior approaches are focused on a certain software layer without addressing the monitoring issues systematically across multiple software layers.

For instance, CA's Introscope, http:11www.ca.com/us/application-management.aspx, focuses on a pre-defined set of monitoring functions in the library/API layers (e.g., J2EE/EJB functions). This monitoring scope covers a common set of popularly used functions across the application programs. With this design choice, while this approach can achieve a competent monitoring performance, it does not systematically cover the functions specific to applications or low level system services such as system calls.

The other kind of example is traditional debugging/tracing tools that are popularly used in the debugging and software engineering, such as disclosed by Gdb: the GNU Project debugger, http//sources.redhat.com/gdb, Valgrind: Nicholas Nethercote and Julian Seward. Valgrind: a framework for heavyweight dynamic binary instrumentation. In Proceedings of the 2007 ACM SIGPLAN conference on Programming language design and implementation (PLDI '07). ACM, New York, N.Y., USA, 89-100: and Pin: C.-K. Luk, R. Cohn, R. Muth, H. Patil, A. Klauser, G. Lowney, S. Wallace, V. J. Reddi, and K. Hazelwood. Pin: building customized program analysis tools with dynamic instrumentation. In Proceedings of the 2005 ACM SIGPLAN conference on Programming language design and implementation, PLDI '05, pages 190-200, New York, N.Y., USA, 2005. ACM.

These tools can track software execution in the granularity of instruction. The tracing with this fine-grained granularity provides detailed runtime program information which is very effective for debugging. However, as the downside, these approaches slow down the program execution with an order of magnitude. Therefore they are not suitable for deployed/production systems.

Accordingly, there is a need for request profiling in service systems with kernel events.

BRIEF SUMMARY OF THE INVENTION

The invention is directed to a system for correlated tracing with automated multi-layer function instrumentation localization that includes a main input of a monitored program, another input of dependent program components, a multi-component call graph analysis component for constructing a structure of the program from the input and representing a state transition of an execution of the program, a tracing endpoints component for events in execution paths of the program that are set to be traced for users interest, a tracing scope localization component wherein for given specified endpoints, the scope of code including relevant code being determined and the tracing scope localization component reducing the monitoring scope and correspondingly the monitoring overhead by including only the code relevant to endpoints in the tracing, an instrumentation of program and components wherein based on the analysis result from the tracing scope localization component, the monitoring agent code being inserted into the monitored application program and this inserted code generating a log of the executed functions, a system code instrumentation component for inserting the monitoring agent code into a low level software to track its activity, a user level tracing component for an application instrumented in the instrumentation of program and components running log information that is generated by the instrument agent, and a synchronize-able multi-layer tracing component wherein for a case where low level events are included in the instrument points, the final output is the integration of user space log and the low level system log, this component providing a method to generate traces from multiple layers in a synchronized way.

In a similar aspect of the invention there is provided a method for correlated tracing with automated multi-layer function instrumentation localization.

These and other advantages of the invention will be apparent to those of ordinary skill in the art by reference to the following detailed description and the accompanying drawings.

DETAILED DESCRIPTION

The present invention is directed to a novel system to automatically instrument and trace application program and related software components to achieve correlated tracing of the program execution. It also includes a method to synchronize traces from multiple software layers.

Tracing endpoints are the set of functions in the program execution path that the developers are interested. One example can be system call events that application programs invoke. Another example can be library functions that application programs use.

In the debugging, it is important to know what other information is related to these monitoring targets because the problem could have occurred due to indirect impact from other related software components. The tracing endpoints and the related events become the total set of functions to be traced in the program (called instrument points). Understanding which program components are related is a complicated task to be manually determined by human users. This invention automatically analyzes the program and generates such instrumentation points to enable correlated tracing.

The generated set of instrumentation points addresses common questions that developers ask when they use monitoring tools. We present several examples of monitoring schemes in FIG. 2 by defining tracing endpoints of monitoring and showing the relevant event information.

Figure 1:
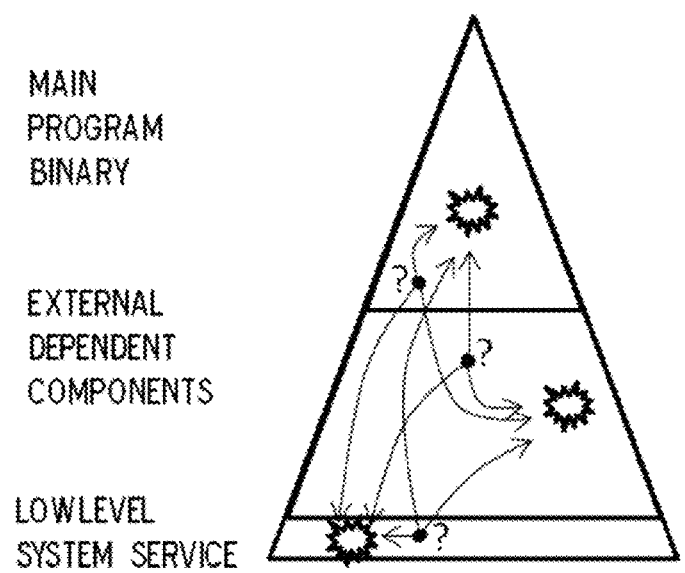
FIG. 1 is an diagram depicting software problems and root cause impact from the same and/or related software layers.
Figure 2:
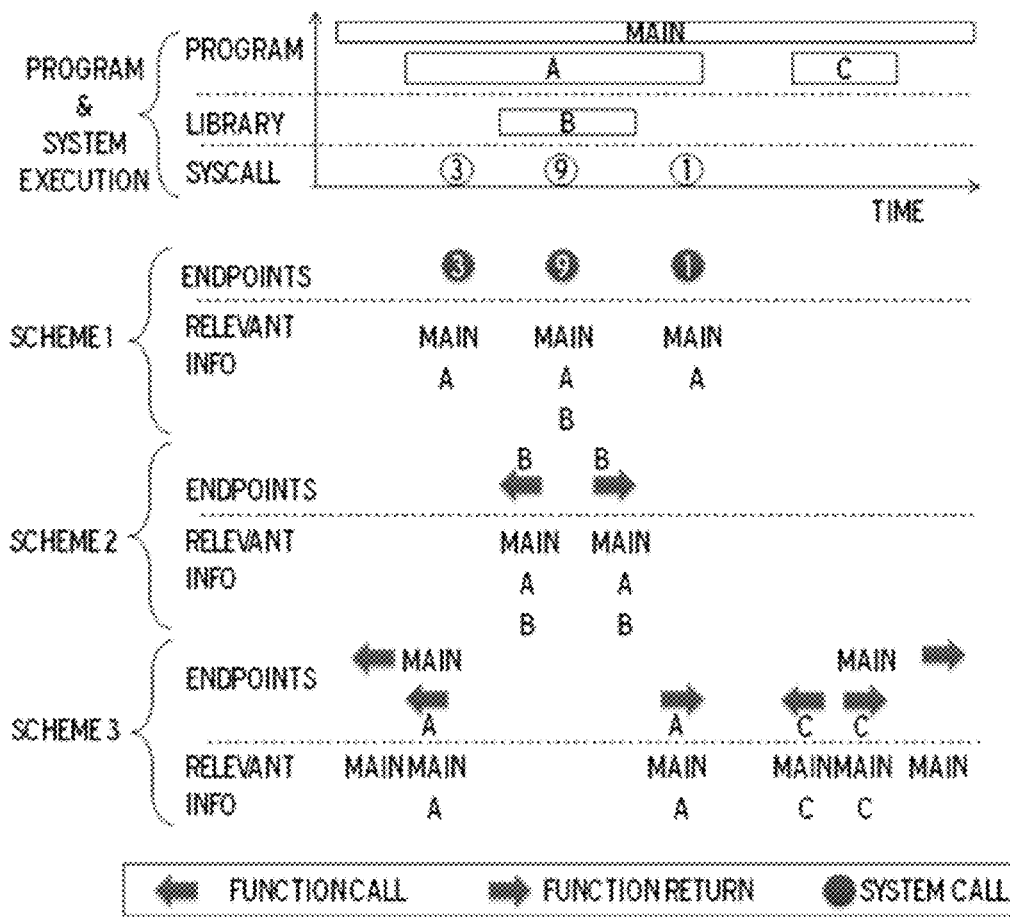
FIG. 2 is a diagram showing program and system execution, and monitoring events.

The top part of FIG. 2 represents the list of actions that occur in the execution of a program. For example, functions "MAIN", "A" and "C" in the program are executed. The function "B" in the library is called once and three system calls are generated during this execution.

System-Driven Events:

In the first example of monitoring schemes (shown as SCHEME1), the tracing endpoints are the system call invocations. This scheme is used to reveal the root cause of system problems caused by low level resources such as I/O, memory, scheduling, or network. Here the important information to understand the root cause is the relevant functions executed in the program while the system calls occur. For instance, in scheme 1 of FIG. 2, for the system call 3, the relevant code is "MAIN" and "A" which are active when this system call occurs.

In this monitoring scheme, not every program code is relevant to the tracing points. For instance, "C" is not involved with system calls. This invention analyzes the dependencies among application code, library code, and lower level events so that unnecessary monitoring overhead can be avoided by including tracing endpoints and only the functions relevant to the endpoints.

Library-Driven Events:

In the second example, a library function "B" is specified as the endpoint. When debugging the invocation of this function, it will be helpful to know what functions invoked this library function and it is shown in the relevant information in SCHEME2 of FIG. 2. From the Figure, we can know the "B" call is made by function "A" which is called by "MAIN" function. By analyzing the binary and related library, our invention generate the list of related functions "MAIN" and "A" along with "B". Here the "C" function is irrelevant to the library call. Thus it is not traced to lower monitoring overhead.

Application-Driven Events:

The third example, the tracing endpoints are the application functions (i.e., "MAIN", "A", and "C"). These events represent the invocations and returns of application functions. For example, in FIG. 2 the left arrows show the call events of user functions and the right arrows represent the returns of such functions. This information is very specific to the application internals, allowing developers to verify the expected behavior of the code that she/he wrote such as the number of invocation of a function. This monitoring strategy narrows down the monitoring scope to the code explicitly written by the developers. Therefore, external library code or low level services are excluded from the tracing.

Figure 3:
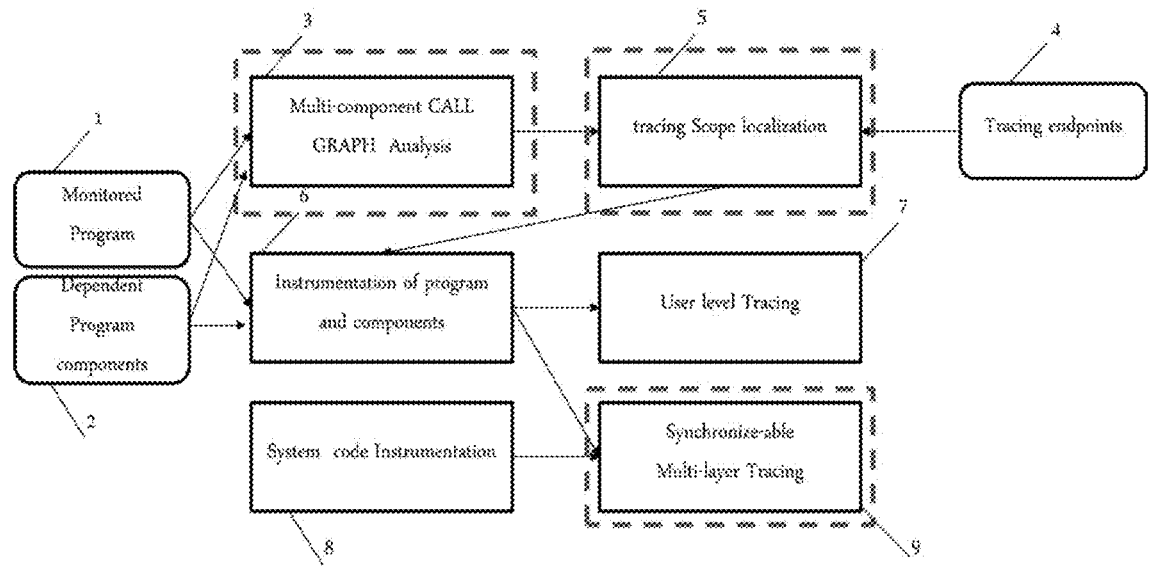
FIG. 3 is a diagram of an exemplary architecture of the appstich, in accordance with the invention.

FIG. 3 presents an exemplary architecture of the present invention, herein also referred to as AppStitch.

The Monitored program component 1 is the application for monitoring that is the main input. The dependent program components 2 are another input for the analysis and monitoring of the program. Most programs rely on functionalities of external program components such as libraries and they should be included particularly for our purposes addressing the monitoring in the entire system level. The multi-component call graph analysis 3 is the process to construct the structure of the program from input. This structure represents the state transition of the program's execution. The tracing endpoints components 4 deals with the events in the program execution paths that are set to be traced for users interest. Respecting the tracing scope localization component 5, given the specified endpoints, the scope of code including relevant code is determined. This process reduces the monitoring scope and correspondingly the monitoring overhead by including only the code relevant to endpoints in the tracing. For the instrumentation of program and components 6, based on the analysis result from the previous module, the monitoring agent code is inserted into the monitored application program. This inserted code generates the log of the executed functions. The system code instrumentation component 7, inserts the monitoring agent code into the low-level software to track its activity. Regarding the user level tracing component 8, as the application instrumented in the component 6 runs, the log information is generated by the instrument agent. As for the synchronize-able multi-layer tracing component 9, in case low level events are included in the instrument points, the final output is the integration of user space log and the low level system log. This component provides a method to generate traces from multiple layers in a synchronized way.

Multi-Component Call Graph Analysis (Component 3)

This component 3 generates a structure of program execution status called multi-components call graph (MCCG). A call graph is a directed graph of application function calls. MCCG is differentiated from a regular call graph in that this graph includes the list of functions and calls which are reachable from the main (or similar) function in the main program binary in the set of multiple dependent program binaries. The generation of MCCG and its details are presented in FIG. 4. Here the circles represent program functions and a directed edge represents a function call from a caller to a callee.

Figure 4:
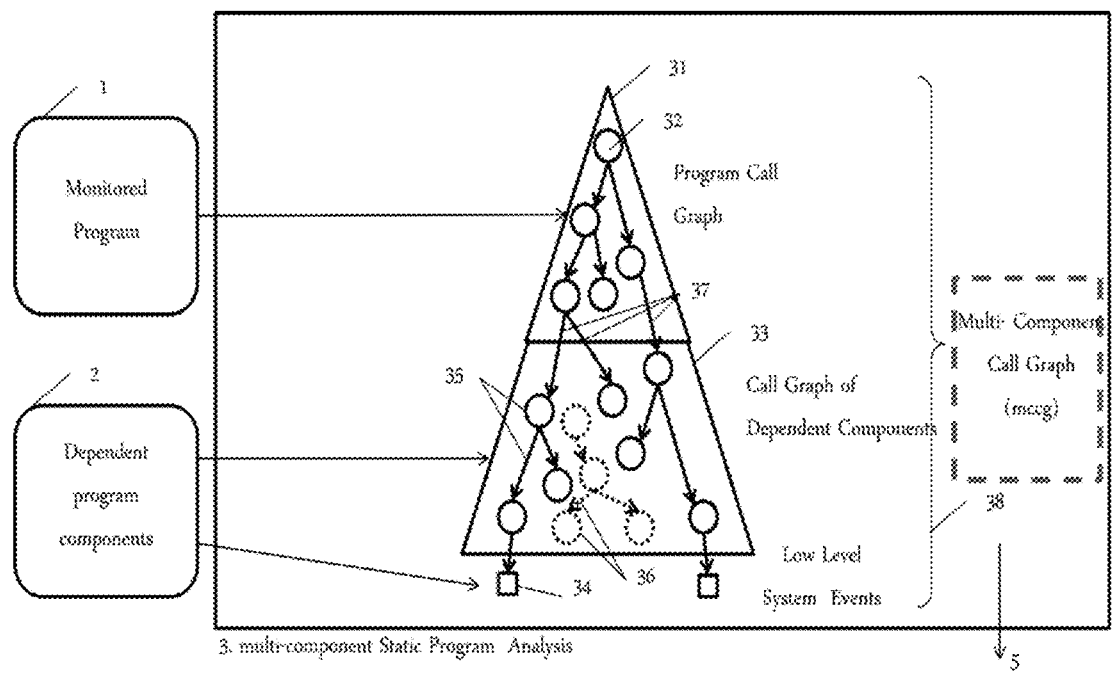
FIG. 4 is a diagram detailing static analysis of program and dependent component, block 3 shown in FIG. 3, in accordance with the invention.
Figure 5:
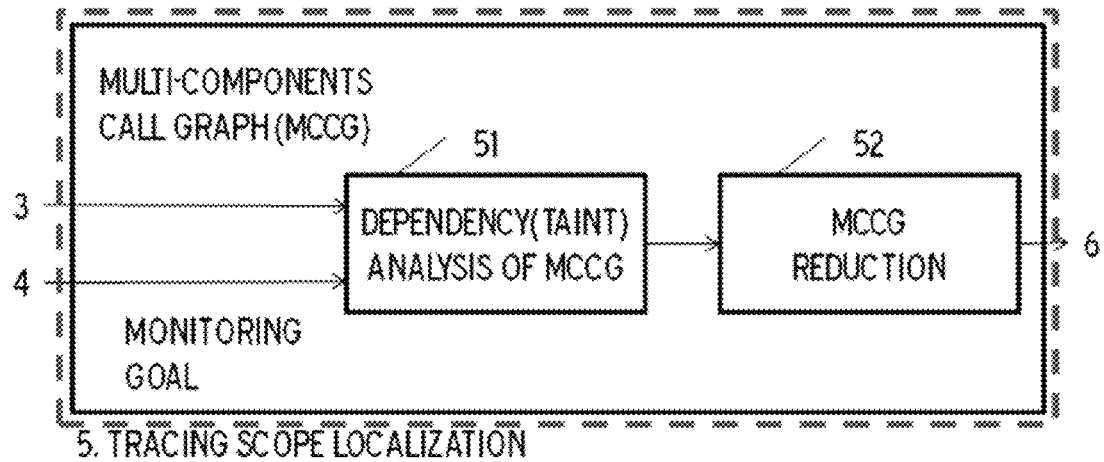
FIG. 5 is a diagram detailing tracing scope localization, block 5 shown in FIG. 3, in accordance with the invention.

The Program call graph 31 in FIG. 4, shows a top smaller triangle that represents a call graph of the main program binary (1). This is the graph, which is typically referred to as the call graph of the program in conventional program analysis.

The main function(s) of the main binary 32 is the main function of the main program binary. It is a function node that is the starting point of the call graph. Regarding call graph of dependent components 33, the lower part of the big triangle represents the functions and calls of dependent code components that are external to the main binary. Dynamically linked libraries belong to this part of the graph. Respecting low level system events 34, these are the events that belong to a lower system layer. A typical example is system call that is not part of the main program and dependent program binaries. The node and edges with dependency 35: The program functions which are reachable from 32. Node and edges without dependency 36 concern program functions which are not reachable from 32. Since only reachable function calls are included in MCCG, these nodes and edges are shown as dotted nodes and edges in FIG. 3. The cross-module edges 37 are function calls between the main binary and others.

The multi-component call graph (MCCG) 38 is the extended call graph representing all function calls reachable from the main function of the main binary. It connects multiple call graphs of dependent program binaries and also includes lower layer events. This new structure of program execution status is essential in the next stage that determines the dependent nodes and edges to the tracing endpoints.

A multi-component call graph (MCCG) G is formally defined as follows. MCCG: $G=(V, E, M, P, D, C, S)$. Where V is the set of all functions in the graph. E is the set of all call edges. M represents the set of main functions in the main binary (32). P is the sub call graph of the main binary (31). D is the sub call graph of dependent binaries outside of P (33). C is the list of edges connecting P and D (37). S is the list of low level system events (34).

Tracing Scope Localization (Component 5)

With the input of MCCG (3) and tracing endpoints (4), this component first analyzes the dependency of multi-component function calls depending on the tracing endpoint. Once the dependency is determined, irrelevant nodes and call edges are pruned out; thereby, reducing the scope of monitored functions in the program. The detailed operations in the sub components 51 and 52 are presented in the following two algorithms.

Dependency (Taint) Analysis of MCCG (Component 51)
Input: G: MCCG, N: tracing endpoints
Output: T: Taint Graph
Algorithm:

```
function DEPANALYSIS(G, N)
    (V, E, M, P, D, C, S) ← G
    V_t = ∅
    E_t = ∅
    Reverse the directions of E
    V_sink = M
    V_source = N
    for each v in V_source do
        Traverse (V, E) starting from the node v until any
    node in V_sink is reached. Put all newly visited nodes in V_t
    and edges in E_t.
        end for
        Reverse the directions of E to originals
        return T = (V_t, E_t, V_source, V_sink)    ▷ Taint Graph
end function
```

Given a MCCG and a set of endpoints, this algorithm determines the set of functions that are relevant to the endpoints by using taint analysis. The output is a sub graph T.

52. MCCG Reduction (Component 52)
Input: G: MCCG,
Output: The reduced graph
Algorithm:

```
function DEPREDUCTION(G, T)
    (V, E) ← G
    (V_t, E_t) ← T
    for each v in V do
        Remove v if v ∉ V_t
    end for
    for each ε in E do
        Remove ε if ε ∉ E_t
    end for
    return G' = (V, E)    ▷ Reduced G
end function
```

The remaining graph is the reduced MCCG. The functions in this graph are given to the next component 6 to be instrumented. They are called instrument points.

Figure 6:
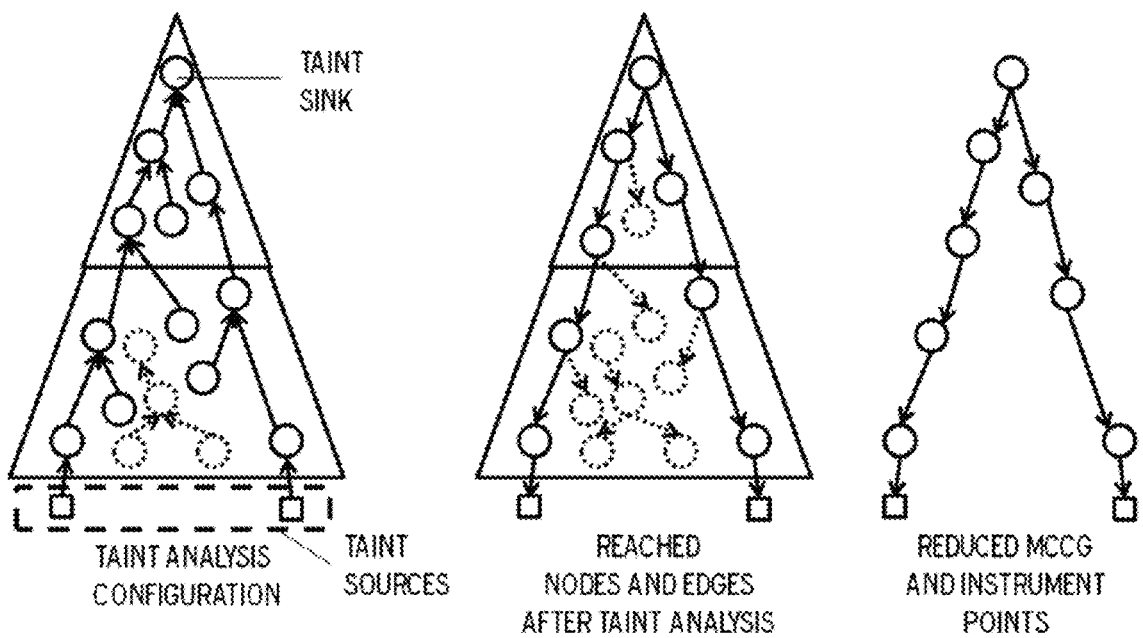
FIG. 6 is a diagram detailing dependency analysis and reduction of MCCG for system driven events, in accordance with the invention.
Figure 7:
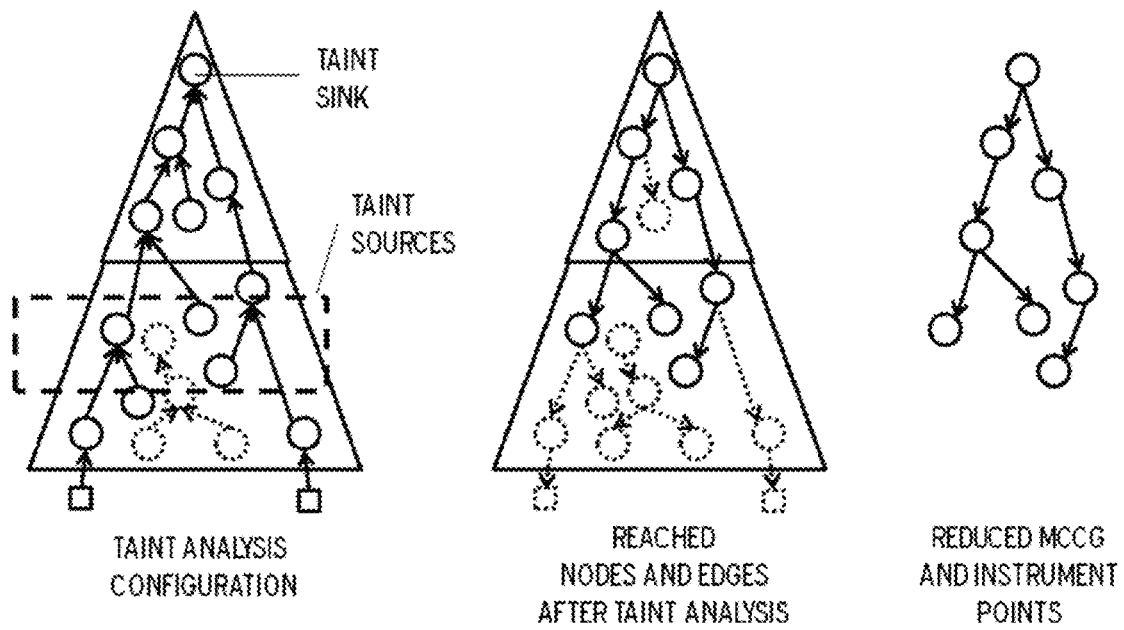
FIG. 7 is a diagram detailing dependence analysis and reduction of MCCG for library driven events, in accordance with the invention.
Figure 8:
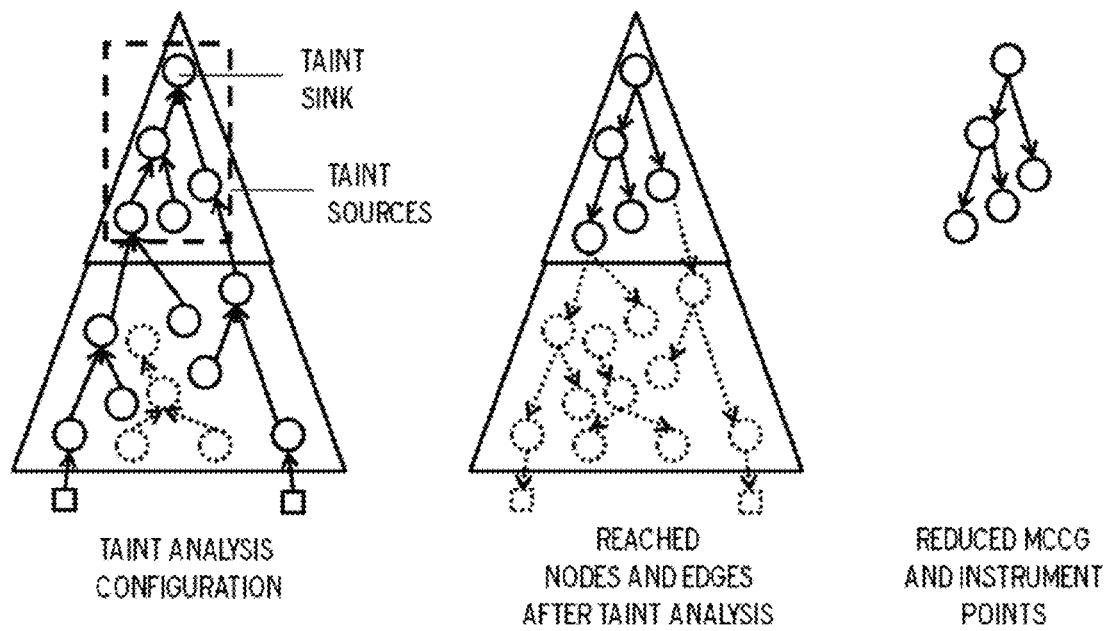
FIG. 8 is a diagram detailing dependence and analysis and reduction of MCCG for application driven events, in accordance with the invention.

Examples demonstrating how these algorithms work are shown in FIGS. 6, 7, and 8, respectively, depicting the analysis and reduction of MCCG for system-drive events, library-driven events, and application-driven events.

Example 1

System-Driven Events

In this monitoring scheme, the low-level system events are the tracing endpoints which become the taint sources and the taint sink is the main function. The right most figure in FIG. 6 shows the reduced MCCG after the dependency analysis and reduction of the graph. We can confirm that the function calls that don't lead to low system events are successfully pruned out. The pruned code corresponds to user level computation inside the application binary and dependent binaries. In the monitoring and analysis which focus on any symptoms in the low level events, such set of events would be out of focus. Therefore we can improve monitoring performance by skipping the instrumentation of such code.

Example 2

Library-Driven Events

In this example, we would like to know what functions are leading to a set of library functions. Then the list of library functions becomes the taint source and the taint sink is the main function as presented in the left figure of FIG. 7. After analyzing dependent functions to these library functions, the rest functions are pruned out; thereby, excluding them from the tracing. The result MCCG is shown in the right most figure of FIG. 7. This monitoring scheme provides a list of functions necessary to understand related behavior for the given library calls.

Example 3

Application-Driven Events

In this monitoring scheme, the list of functions in the main binary is the taint source and the taint sink is the main function of the main binary. The left most sub figure in FIG. 8 presents this configuration of taint analysis. After the taint is propagated, the nodes and edges marked with taint are shown in the middle sub figure of FIG. 8. On its right figure, the reduced MCCG is shown after pruning untainted nodes and call edges.

Instrumentation of Program and Components (Component 6)

Figure 9:
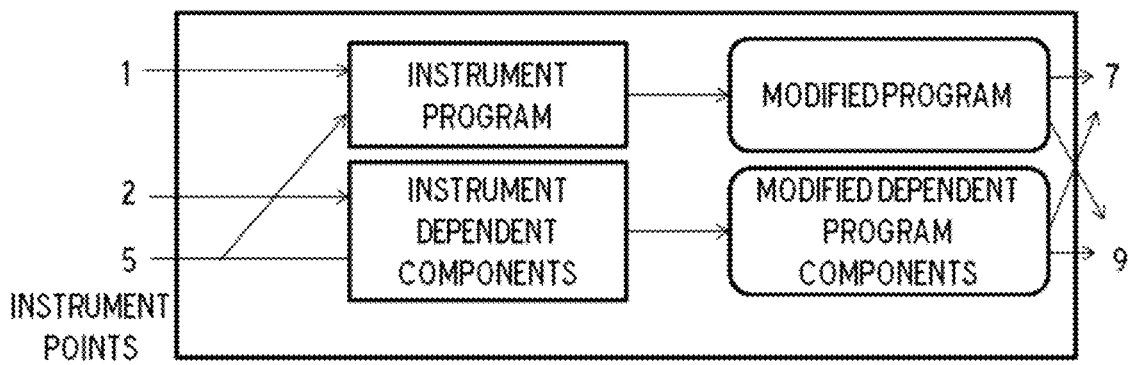
FIG. 9 is a diagram detailing instrumentation of program and components, block 6 in FIG. 3.

Given the list of functions to be instrumented, this component patches the program binaries and generates modified program binaries that include the logging agents. FIG. 9 presents the details of this procedure. Specifically the instrument points consist of the functions of the program binary and dependent components. The list of such functions is used to patch the main program and dependent components. And the modified program binaries are generated.

If the generated instrument points are in the main program binary or libraries, the component 7 performs instrumentation necessary for application layer tracing. If the instrument points also include the low level system, the component 7 and 8 will operate together for instrumentation. Then in the component 9, both of application and low system layers are traced in a synchronized way.

Synchronize-Able Multi-Layer Tracing (Component 9)

In case we trace low system level events (and related high level events), we need to collect events from both of user level and low system level. Here the important requirement of this feature is that these two types of events should be able to be synchronized accurately. In order to meet this requirement, these two layers should use a common timestamp counter. This counter should be available in the entire scope of the system. Also it should provide a method to read and update it atomically.

The x86 architecture has a 64-bit register called Time Stamp Counter (TSC) that counts the number of cycles from reset. Since this register is updated by the architecture, there is no atomic update issue. RDTSC instruction provides an API for atomic reads.

Traces are generated from both of user level and low system level using the common timestamp counter. Then later they are synchronized during the offline analysis. We call this technique for separated trace recording in more than one layer based on the common timestamp counter, a Synchronize-able Multi-Layer Tracing.

Figure 10:
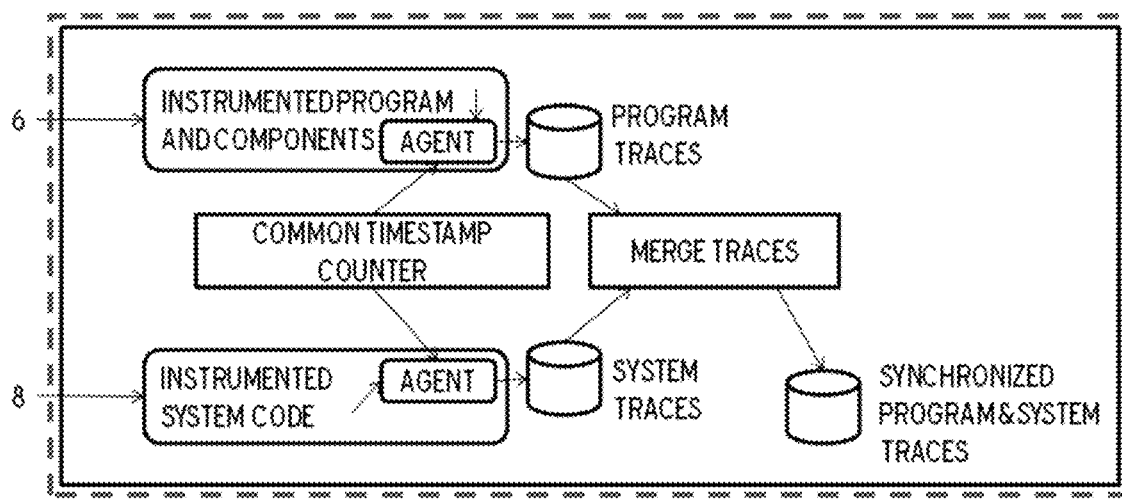
FIG. 10 is a diagram detailing synchronize-able multi-layer tracing, block 9 in FIG. 3, in accordance with the invention.

FIG. 10 shows how this component works. Both of program code and system code are instrumented with the log agent code. When these agents generate the monitoring events, they obtain timestamp values from the common timestamp counter which is globally available. The events from program traces and system traces are logged in different system layers. However, due to their anomic time stamp values such events can be ordered and synchronized. The combined trace will provide the system level information integrating both of application and system level events.

From the foregoing, it can be appreciated that the present invention solution provides higher quality of monitoring information. Compared to traditional solutions that have the predefined set of instrumentation functions, it provides the list of program functions to be traced necessary to understand problems after systematic analysis of code. Also this invention determines which code is not relevant to the monitoring scheme and improves the monitoring performance by automatically selecting only necessary functions.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A system for correlated tracing with automated multi-layer function instrumentation localization comprising:
   a main input of a monitored program executed by a processor of the system where program binary is used to determine reachable points from given input;
   another input of dependent program components;
   a multi-component call graph (MCCG) analysis component for constructing a lossy scope structure of the program from said input and representing a state transition of an execution of the program, wherein the graph is a function of V, E, M, P, D, C, S, where V is a set of all functions in the graph, E is a set of all call edges, M represents a set of main functions in a main binary, P is a sub call graph of the main binary, D is a sub call graph of dependent binaries outside of P, C is a list of edges connecting P and D, and S is a list of low level system events,
   wherein the MCCG represents function calls reachable from a main function of a main binary and connects multiple call graphs of dependent program binaries and low layer events, and wherein the MCCG is used to determine dependent nodes and edges to tracing endpoints and used as part of an automated dependency analysis for a relevant monitoring scope given a program code of interest by users;
   a tracing endpoints component for events in execution paths of the program that are set to be traced for users interest;
   a tracing scope localization component wherein for given specified endpoints, the scope of code including relevant code being determined and the tracing scope localization component reducing the monitoring scope and correspondingly the monitoring overhead by including only the code relevant to endpoints in the tracing;
   an instrumentation of program and components wherein based on the analysis result from the tracing scope localization component, the monitoring agent code being inserted into the monitored application program and this inserted code generating a log of the executed functions;
   a system code instrumentation component for inserting the monitoring agent code into a low level software to track its activity based on an analysis result from a previous module;
   a user level tracing component for wherein as an application instrumented in the instrumentation of program and components runs log information is generated by the instrument agent; and
   a synchronize-able multi-layer tracing component wherein for a case of low level events being included in the instrument points, the final output being the integration of the user space log and the low level system log, this component providing a method to generate traces from multiple layers in a synchronized way.

2. The system of claim 1, wherein said multi-component call graph analysis component comprises generating a structure of program execution status called multi-components call graph (MCCG) produced from program analysis, said call graph being a directed graph of application function calls, said MCCG being differentiated from a regular call graph in that this graph includes the list of functions and calls which are reachable from a main or similar function in the main program binary in a set of multiple dependent program binaries.

3. The system of claim 1, wherein said tracing scope localization component comprises wherein, with an input of a multi-component call graph from said multi-component call graph analysis component and the tracing endpoints, first analyzing the dependency of multi-component function calls depending on the tracing endpoints and once the dependency is determined, irrelevant nodes and call edges being pruned out; thereby, reducing the scope of monitored functions in the program.

4. The system of claim 1, wherein said tracing scope localization component comprises a dependency taint analysis of multi-component call graph MCCG input from the multi-component call graph analysis component and an MCCG reduction responsive to the dependency taint analysis.

5. The system of claim 4, wherein said dependency taint analysis comprises, for a given MCCG and set of endpoints, determining a set of functions that are relevant to the endpoints by using a taint analysis.

6. The system of claim 1, wherein said synchronize-able multi-layer tracing component comprises, in case low system level events and related high level events are traced, collecting events from both of user level and low system level, an important requirement being that these two types of events should be able to be synchronized accurately and for meeting this requirement, these two layers using a common time stamp counter that should be available in the entire scope of the system and providing a method to read and update it atomically.

7. The system of claim 6, wherein traces are generated from both the user level and the low system level using the common timestamp counter and then the traces are synchronized during an offline analysis.

8. The system of claim 1, wherein said synchronize-able multi-layer tracing component comprises program code and system code being instrumented with a log agent code, when the log agents generate the monitoring events they obtain timestamp values from a common timestamp counter which is globally available, events from program traces and system traces being logged in different system layers and due to their atomic time stamp values such events can be ordered and synchronized with the combined trace providing system level information integrating both application and system level events.

9. A method for correlated tracing with automated multi-layer function instrumentation localization comprising the steps of:
providing a main input of a monitored program;
providing another input of dependent program components;
constructing, with a multi-component call graph (MCCG) G analysis component, a structure of the program from the input and representing a state transition of an execution of the program, wherein G is a function of V, E, M, P, D, C, S, where V is a set of all functions in the graph, E is a set of all call edges, M represents a set of main functions in a main binary, P is a sub call graph of the main binary, D is a sub call graph of dependent binaries outside of P, C is a list of edges connecting P and D, and S is a list of low level system events wherein the MCCG represents function calls reachable from a main function of a main binary and connects multiple call graphs of dependent program binaries and low layer events, and wherein the MCCG is used to determine dependent nodes and edges to tracing endpoints;
providing a tracing of endpoints for events in execution paths of the program that are set to be traced for users interest;
providing, with a tracing scope localization component, wherein for given specified endpoints, the scope of code including relevant code being determined and the tracing scope localization component reducing the monitoring scope and correspondingly the monitoring overhead by including only the code relevant to endpoints in the tracing;
providing an instrumentation of program and components wherein based on the analysis result from the tracing scope localization component, the monitoring agent code being inserted into the monitored application program and this inserted code generating a log of the executed functions;
inserting, with a system code instrumentation component, the monitoring agent code into a low level software to track its activity;
providing a user level tracing component for wherein as an application instrumented in the instrumentation of program and components runs log information is generated by the instrument agent; and
providing a synchronize-able multi-layer tracing component wherein in case low level events are included in the instrument points, the final output is the integration of user space log and the low level system log, this component providing a method to generate traces from multiple layers in a synchronized way.

10. The method of claim 9, wherein said multi-component call graph analysis component comprises generating a structure of program execution status called multi-components call graph (MCCG), said call graph being a directed graph of application function calls, said MCCG being differentiated from a regular call graph in that this graph includes the list of functions and calls which are reachable from a main or similar function in the main program binary in a set of multiple dependent program binaries.

11. The method of claim 10, wherein said multi-component call graph MCCG comprises an extended call graph representing all function calls reachable from the main function of the main binary and for connecting multiple call graphs of dependent program binaries and also including lower layer events.

12. The method of claim 9, wherein said tracing scope localization component comprises wherein, with an input of a multi-component call graph from said multi-component call graph analysis component and the tracing endpoints, first analyzing the dependency of multi-component function calls depending on the tracing endpoints and once the dependency is determined, irrelevant nodes and call edges being pruned out; thereby, reducing the scope of monitored functions in the program.

13. The method of claim 9, wherein said tracing scope localization component comprises a dependency taint analysis of multi-component call graph MCCG input from the multi-component call graph analysis component and an MCCG reduction responsive to the dependency taint analysis.

14. The method of claim 13, wherein said dependency taint analysis comprises, for a given MCCG and set of endpoints, determining a set of functions that are relevant to the endpoints by using a taint analysis.

15. The method of claim 9, wherein said synchronize-able multi-layer tracing component comprises, in case low system level events and related high level events are traced, collecting events from both of user level and low system level, an important requirement being that these two types of events should be able to be synchronized accurately and for meeting this requirement, these two layers using a common time stamp counter that should be available in the entire scope of the system and providing a method to read and update it atomically.

16. The method of claim 15, wherein traces are generated from both the user level and the low system level using the common timestamp counter and then the traces are synchronized during an offline analysis.

17. The method of claim 9, wherein said synchronize-able multi-layer tracing component comprises program code and system code being instrumented with a log agent code, when the log agents generate the monitoring events they obtain timestamp values from a common timestamp counter which is globally available, events from program traces and system traces being logged in different system layers and due to their atomic time stamp values such events can be ordered and synchronized with the combined trace providing system level information integrating both application and system level events.

* * * * *